United States Patent
Sandoval (10) Patent No.: US 12,454,817 B2
(45) Date of Patent: Oct. 28, 2025

(54) BAFFLE WITH ANTI-REVERSE STOPPERS

(71) Applicant: INSINKERATOR LLC, Benton Harbor, MI (US)

(72) Inventor: Matthew Sandoval, Waukesha, WI (US)

(73) Assignee: InSinkErator LLC, Benton, MI (US)

( * ) Notice: Subject to any disclaimer, the term of this patent is extended or adjusted under 35 U.S.C. 154(b) by 213 days.

(21) Appl. No.: 18/108,382

(22) Filed: Feb. 10, 2023

(65) Prior Publication Data

US 2023/0257979 A1    Aug. 17, 2023

Related U.S. Application Data

(60) Provisional application No. 63/309,772, filed on Feb. 14, 2022.

(51) Int. Cl.
| | | |
|---|---|---|
| *E03C 1/264* | (2006.01) | |
| *B02C 18/00* | (2006.01) | |
| *E03C 1/266* | (2006.01) | |

(52) U.S. Cl.
CPC .......... *E03C 1/264* (2013.01); *B02C 18/0092* (2013.01); *E03C 1/2665* (2013.01)

(58) Field of Classification Search
CPC .......... E03C 1/26; E03C 1/264; E03C 1/2665; B02C 23/36; B02C 2201/063
USPC ......................................... 241/46.013–46.16
See application file for complete search history.

(56) References Cited

U.S. PATENT DOCUMENTS

| | | | |
|---|---|---|---|
| 2,793,373 A | | 5/1957 | Ewing |
| 2,834,554 A | * | 5/1958 | Bebinger .............. E03C 1/2665 |
| | | | 241/46.016 |
| 2,875,958 A | | 3/1959 | Wieczorek |
| 2,896,866 A | | 7/1959 | Hyde |
| 2,948,482 A | | 8/1960 | Jordan |
| 2,980,351 A | | 4/1961 | Greene |
| 3,163,371 A | | 12/1964 | Hardy |
| 3,693,892 A | | 9/1972 | Musa |
| 6,719,228 B2 | | 4/2004 | Berger et al. |
| 7,264,188 B2 | | 9/2007 | Anderson et al. |
| 7,967,225 B1 | | 6/2011 | Schulz |

(Continued)

FOREIGN PATENT DOCUMENTS

| | | |
|---|---|---|
| CN | 1496284 A | 5/2004 |
| JP | 2005211866 | 8/2005 |

(Continued)

OTHER PUBLICATIONS

Becbas, "Becbas Element 7 Garbage Disposal, 1HP 2700RPM Household Feed Waste Disposer, with Power Cord," brochure (1996-2022) 10 pages.

(Continued)

*Primary Examiner* — Jared O Brown
(74) *Attorney, Agent, or Firm* — Brooks Kushman P.C.

(57) ABSTRACT

Food waste disposers, particularly food waste disposers for installation under a sink, can include a mounting assembly that has a baffle. Each baffle of the present technology can include an outer rim, a plurality of flaps that are attached to the outer rim by a hinge and extend radially inwardly from the outer rim. Each flap can have an anti-reverse stopper that is intended to resist upward movement of the flap during operation, to prevent food waste from backing-up out of the disposer into the sink.

20 Claims, 4 Drawing Sheets

(56) References Cited

U.S. PATENT DOCUMENTS

| | | | |
|---|---|---|---|
| 11,306,467 | B2 | 4/2022 | Paweleck et al. |
| 2005/0242219 | A1 | 11/2005 | Hanson |
| 2016/0076234 | A1 | 3/2016 | Hammer et al. |
| 2020/0347584 | A1* | 11/2020 | Berger ................. E03C 1/2665 |
| 2021/0164208 | A1 | 6/2021 | McClory |
| 2021/0381212 | A1* | 12/2021 | Bohlen .................... E03C 1/26 |

FOREIGN PATENT DOCUMENTS

| | | |
|---|---|---|
| WO | 2019/191183 | 10/2019 |
| WO | 2019/241505 | 12/2019 |

OTHER PUBLICATIONS https://www.grainger.com/product/GRAINGER-APPROVED-Splash-Guard-Rubber-4FEW7?opr=PDPBRDSP&analytics=dsbrItems_31XJ21&isShellOptimized=true (Feb. 9, 2023) 1 page.

International Search Report and Written Opinion for International Application No. PCT/US2023/012899 dated May 12, 2023 (13 pages).

\* cited by examiner

BAFFLE WITH ANTI-REVERSE STOPPERS

CROSS-REFERENCE TO RELATED APPLICATIONS

This application claims the benefit of U.S. provisional application Ser. No. 63/309,772 filed Feb. 14, 2022, the disclosure of which is hereby incorporated in its entirety by reference herein.

FIELD OF TECHNOLOGY

The present technology relates to waste disposer systems such as food waste disposer systems, and more particularly to baffles and baffle components or features of such food waste disposer systems.

BACKGROUND

Food waste disposers are used to comminute food scraps into particles small enough to safely pass through household drain plumbing. Conventional food waste disposers typically include a food conveying section, a motor section, and a grinding mechanism disposed between the food conveying section and the motor section. The food conveying section includes a housing that forms an inlet, or throat opening, connected to a sink flange for receiving food waste and water. The food conveying section conveys the food waste to the grinding mechanism, and the motor section includes a motor imparting rotational movement to a motor shaft to operate the grinding mechanism.

Additionally, in conventional food waste disposers, there is typically a baffle or splash guard across the throat opening. For example, in some food waste disposers, the throat baffle is inserted into the sink opening (strainer flange) and is removable by the user from the sink side. Also for example, in some other food waste disposers, the baffle is integrated with the mounting gasket and is only removable when the entire disposer is dismounted from the sink.

The baffle of a food waste disposer can serve any of a variety of different purposes. For example, in at least some conventional embodiments, during disposer operation the baffle prevents splash back or particle ejection during grinding. Also for example, the baffle in many or most (if not all) conventional embodiments constitutes the primary user interface with the disposer, as the food waste must pass through the baffle, usually assisted by the operator, to enter the grind chamber. Further for example, the baffle, also in at least some conventional embodiments, prevents foreign objects such as silverware or sponges from entering the disposer both during operation and when not in use.

Notwithstanding the effectiveness of certain conventional baffles in reducing noise during grinding, at least some such conventional baffles can have undesirable side effects. For example, the presence of the baffles in sinks can result in the backing up of water into the sinks. In some cases, when water flows through a baffle into the grind chamber of a disposer, air inside the grind chamber is displaced and is vented up out of the grind chamber back through the baffle. Although there can be vent features or openings in the baffle that are intended to facilitate the venting out of the displaced air from the disposer, in some circumstances the flowing water obstructs the vent openings before the displaced air has been vented, which prevents or restricts the air from leaving the grind chamber. Consequently, an air bubble can develop under the baffle, and the air bubble that is formed under the baffle prevents the water from draining through the baffle and causes water to back up into the strainer flange and into the sink. Such operation can appear to indicate a clogged sink problem to a user, and cause concern for the user. Further, even though a user can readily remedy such operation by pushing down on the baffle and displacing the trapped air (which can be colloquially referred to as "burping the baffle"), the user can find taking such action to be inconvenient or distasteful.

Also for example, the presence of a conventional baffle can make it undesirably difficult to get food waste into the grinding chamber of a disposer. In some cases, to achieve the desired passing of food into the grinding chamber, users will push food through the baffle with either their hands or various utensils or devices. However, users again can find taking such actions to be inconvenient or distasteful. Additionally, although other conventional baffles have pleats, or flaps, that may quickly sag or otherwise bend downwardly when the baffles are in use, so as to create larger center openings and diminish the resistance posed by the baffles to food waste entering the disposers, food disposers employing such baffles can be viewed by some users as operating in a manner that is overly-aggressive in terms of the extent to which the disposers draw food into the grinding chambers of the disposers. Additionally, the presence of sagging baffles in some embodiments can also increase the probability of foreign objects entering the disposer. Further, baffles having pleats or flaps that are designed to easily bend downwardly to allow food to pass into the disposer also tend to bend upwards just as easily, which can allow food to back up out the grind chamber of the disposer into the sink during operation, which is highly undesirable.

It can be recognized that it is often desired that a given throat baffle of a given disposer satisfy a variety of different functional objectives, all when implemented in conjunction with that given disposer. Indeed, it is often desired that two or more, or all, of the following objectives be met by a single baffle, at least when operated at different times or under different circumstances (if not simultaneously or substantially simultaneously), when implemented in conjunction with a given disposer: the baffle should have pleats that do not sag or at least do not excessively sag; the baffle should operate to prevent or at least significantly inhibit material from exiting the grind chamber by way of the baffle; the baffle should also allow appropriate material (e.g., food waste) to easily enter the grind chamber; the baffle should further make it more difficult for inappropriate material to enter the grind chamber; the baffle should attenuate noise (e.g., noise from the grind chamber as the disposer is run); and the baffles should permit adequate water flow, or in some cases facilitate high water flow, for grinding and promoting the flow of material out of the disposer by way of a drain outlet.

Notwithstanding the above, satisfying several or all of the aforementioned various functional objectives by way of a single baffle when implemented in conjunction with a given disposer can be challenging, particularly insofar as several of these functional objectives tend to be in conflict with one another to a significant degree. For example, as already discussed, although some conventional baffles are capable of providing significant noise attenuation, such conventional baffles can suffer from one or more side effects resulting from design features that are provided to achieve such noise attenuation. Thus, with respect to at least some conventional sound reducing baffles, users will complain that the baffles make it too difficult for food to pass into the grinding chambers (e.g., food cannot pass through the baffles as freely as may be desired), and yet be pleased with the reduced noise levels associated with the disposers during grinding operation.

Additionally, not only can it be difficult to satisfy a variety of functional objectives substantially simultaneously in general, but also the difficulty of doing so through the use of a particular baffle design can be exacerbated by the fact that there exist numerous different possible installation set ups, arrangements, and environments with respect to which the baffle can be implemented. For example, different plumbing arrangements (e.g., different kitchen faucets having a wide range of flow rates) or water temperatures that are experienced during the operation of different disposers and associated baffles can impact the ability of water to flow through a baffle such that a given baffle will achieve desired water flow when implemented in connection with one plumbing arrangement or when the flowing water is at a first temperature, but will not achieve the same desired water flow when implemented in connection with a different plumbing arrangement or when the flowing water is at a second temperature.

Thus, conventional baffles often are particularly suitable for use in connection with particular installation set ups, arrangements, or environments, within which those baffles can allow one or more particular functional objectives to be achieved, rather than other installation set ups, arrangements, or environments. Conversely, particular installation set ups, arrangements, or environments may be particularly suited to receive particular conventional baffle designs, but not others, given the particular functional objectives that the particular baffle designs can achieve when implemented in those installation set ups, arrangements, or environments. Correspondingly, to achieve different functional objectives at different times in connection with a particular installation set up, arrangement, or environment, it may be necessary to replace one baffle with a different baffle. Because the characteristics of conventional baffle designs are typically suited for achieving one or more particular functional objectives (but not other(s)) when implemented in connection with particular installation set ups, arrangements, or environments, users may be undesirably restricted in terms of the approaches that are available for addressing various concerns in various disposer implementation contexts.

Accordingly, it would be desirable if one or more improved baffles or disposer systems employing baffles could be developed that overcame one or more of the above-described limitations associated with conventional baffles or disposer systems, or that achieved one or more other objectives relating to baffles or disposer systems employing baffles.

SUMMARY

Waste disposer systems having baffles and baffles for use in waste disposer systems are disclosed herein.

In one aspect, a baffle for a food waste disposer is provided that includes an outer rim, a plurality of flaps, and an anti-reverse stopper attached to the hinge end of each flap. The outer rim extends circumferentially about a central axis. Each flap has a hinge end and a radially inward end, the hinge end being attached to the outer rim by a hinge. Additionally, each flap extends radially inwardly from the hinge toward the central axis to the radially inward end. Each anti-reverse stopper extends upwardly from the hinge end of the flap to which the anti-reverse stopper is attached. Further, each anti-reverse stopper has a radially-outward end that is spaced apart from the outer rim when the flap to which the anti-reverse stopper is attached is in a resting position.

In another aspect, a food waste disposer system is provided that includes a food waste disposer, and a mounting assembly configured to attach the food waste disposer to a sink. The mounting assembly included a baffle, a sink flange, and an upper mounting flange. The sink flange is configured to be attached to the sink, and the upper mounting flange is configured to couple the disposer assembly to the sink flange. The baffle includes an outer rim, a plurality of flaps, and an anti-reverse stopper attached to the hinge end of each flap. The outer rim extends circumferentially about a central axis. Each flap has a hinge end and a radially inward end, the hinge end being attached to the outer rim by a hinge. Additionally, each flap extends radially inwardly from the hinge toward the central axis to the radially inward end. Each anti-reverse stopper extends upwardly from the hinge end of the flap to which the anti-reverse stopper is attached. Further, each anti-reverse stopper has a radially-outward end that is spaced apart from the outer rim when the flap to which the anti-reverse stopper is attached is in a resting position.

Examples of either of the above aspects may also include one or more of the following features. Each anti-reverse stopper may abut the inner surface of the outer rim when the flap to which the anti-reverse stopper is attached is in a raised position, and may provide resistance to upward movement of the flap to which the anti-reverse stopper is attached beyond the raised position. The hinge end of each flap may be wider than the radially inward end of the flap. The hinge end of each flap may include at least one flap opening configured to allow air and water to pass through the baffle. Each anti-reverse stopper may extend radially inwardly along at least a portion of a length of the flap to which the anti-reverse stopper is attached. Each anti-reverse stopper may be tapered, such that a thickness of the anti-reverse stopper is greatest at the radially-outward end and the thickness of the anti-reverse stopper is reduced as the anti-reverse stopper extends radially inwardly.

Moreover, any of the examples discussed above may have any suitable shape or dimensions. For example, each anti-reverse stopper may have a pyramidal shape. As another example, each anti-reverse stopper may extend radially inwardly along from about 25% to about 50% of the length of the flap to which the anti-reverse stopper is attached. As a third example, the radially-outward end of each anti-reverse stopper may be spaced apart from the outer rim when the flap to which the anti-reverse stopper is attached is in a resting position by a distance that is from about 0.025 inches to about 0.075 inches. Moreover, each hinge, each flap and each anti-reverse stopper may be integrally formed with the outer rim.

BRIEF DESCRIPTION OF THE DRAWINGS

Specific examples have been chosen for purposes of illustration and description, and are shown in the accompanying drawings, forming a part of the specification.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation. The Figures are not necessarily drawn to scale, and the use of the same reference symbols in different drawings indicates similar or identical items unless otherwise noted. Further, use of directional terms herein, such as "upwardly" and "downwardly," refers to directions relative to the page of the Figures as illustrated.

DETAILED DESCRIPTION

The present technology relates to food waste disposer systems, such as food waste disposer systems that can be installed under a sink, and baffles for use in such food waste disposer systems.

Figure 1:
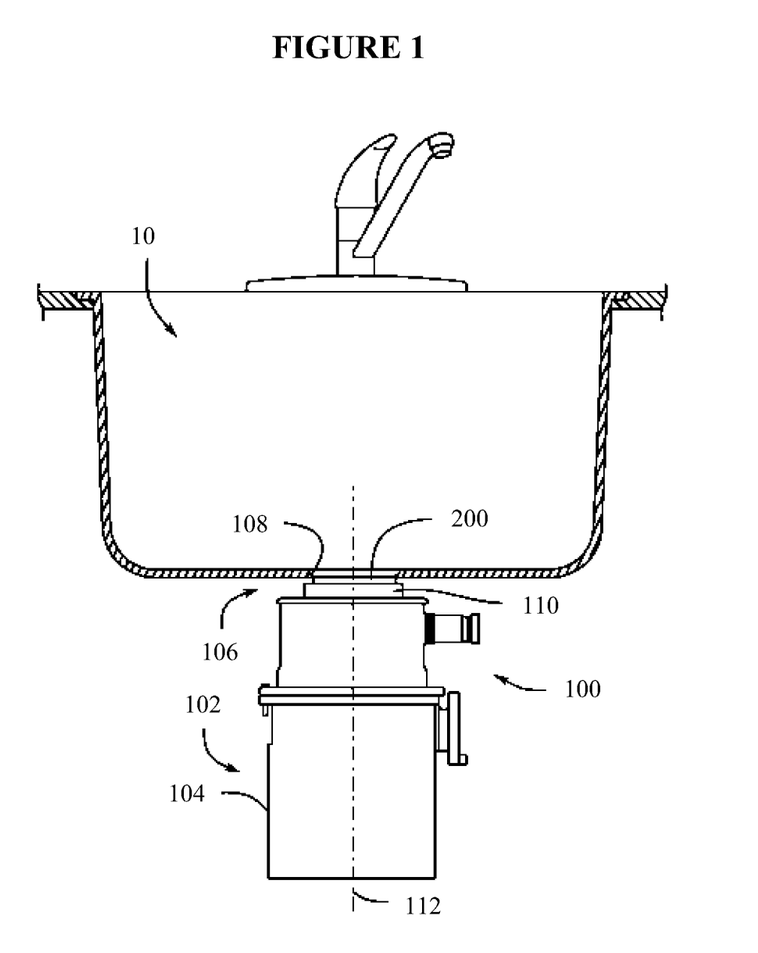
FIG. 1 is a partly cross-sectional, partly front elevation view of one example of a food waste disposer system of the present technology, mounted in relation to a sink (shown in cutaway).
Figure 2:
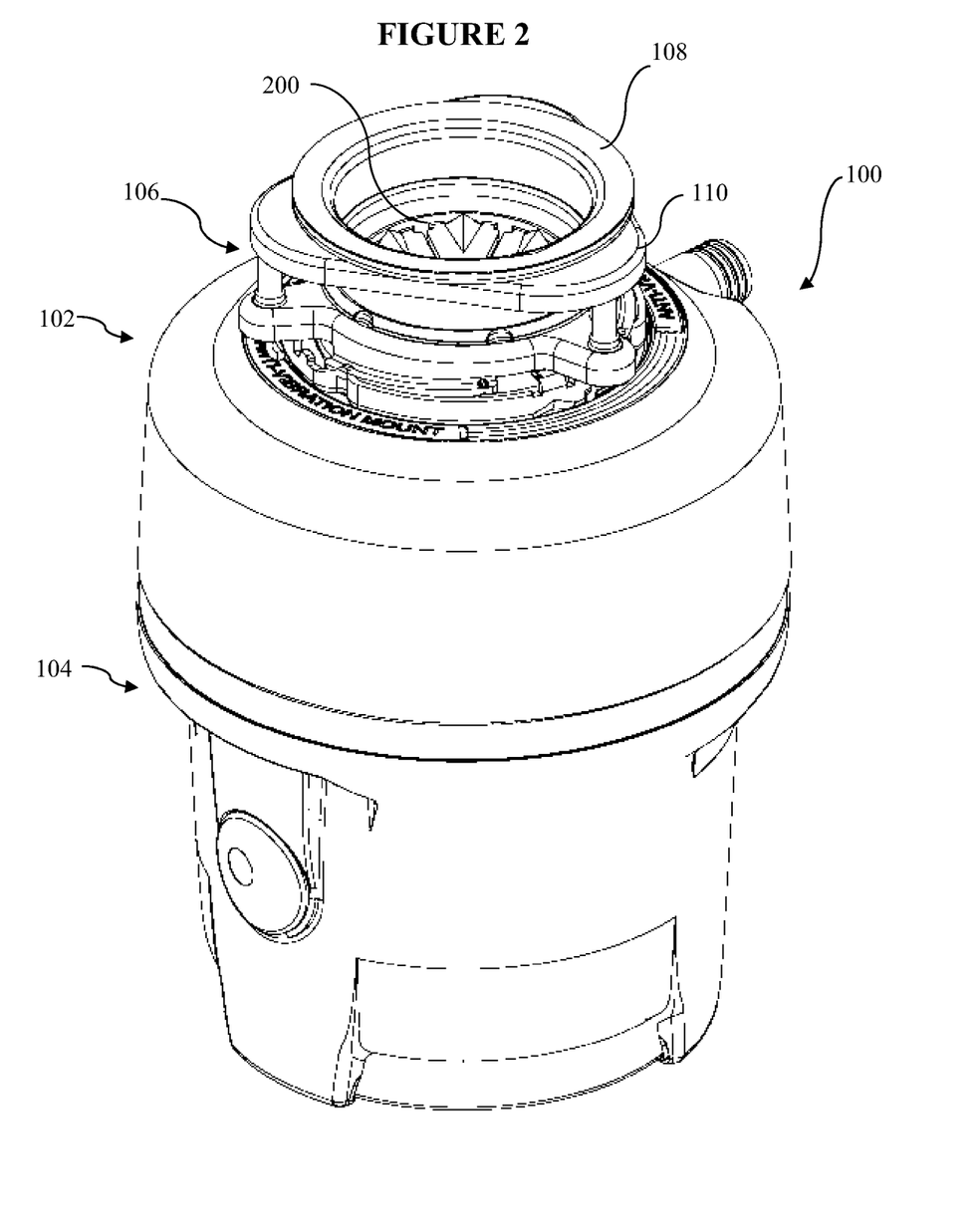
FIG. 2 is a front perspective view of the food waste disposer system of FIG. 1, not mounted on a sink.
Figure 3:
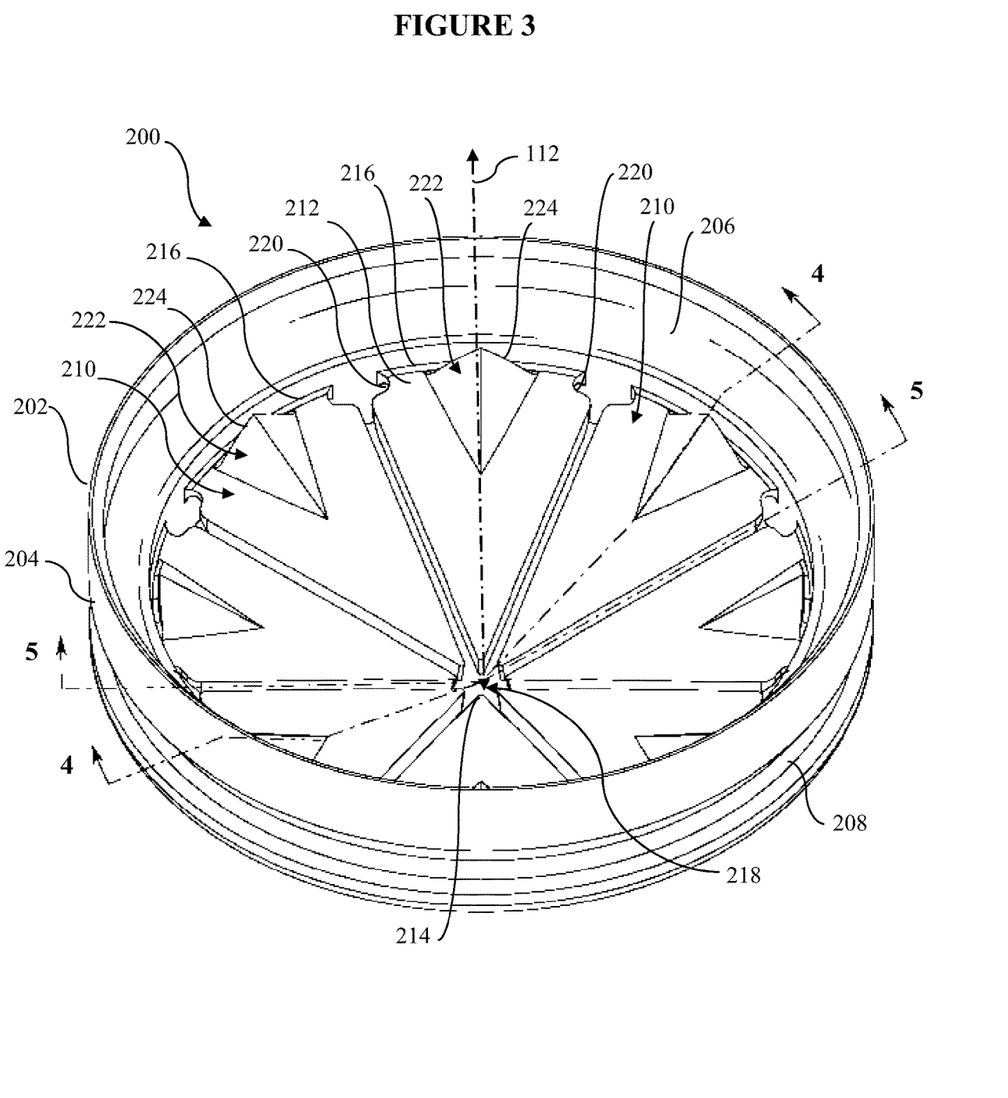
FIG. 3 is a top perspective view of one example of a baffle of the present technology that can be used in a food waste disposer system of the present technology.
Figure 4:
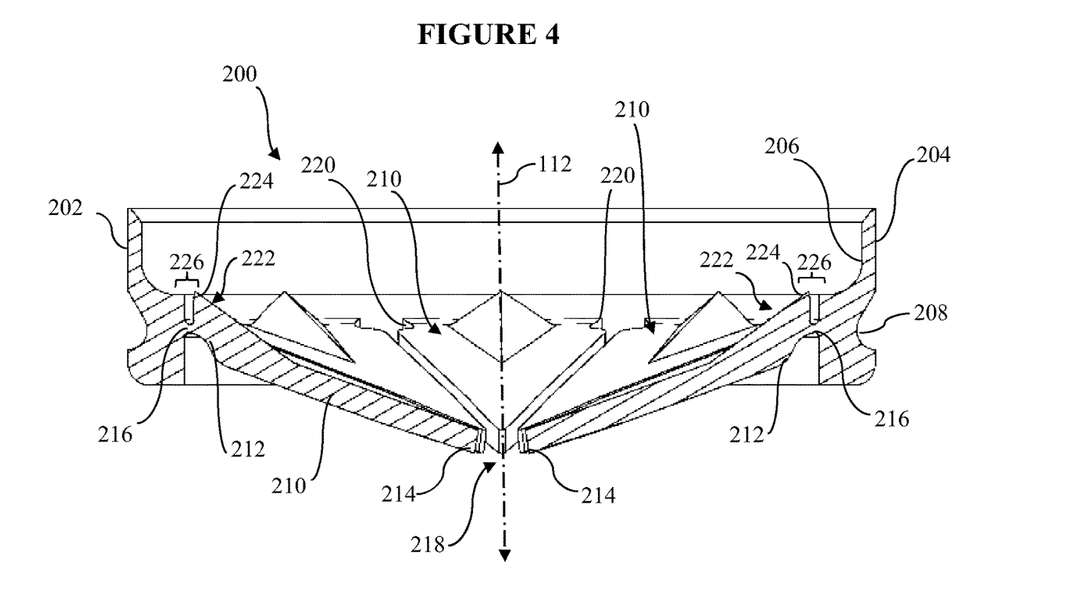
FIG. 4 is a side cut-away view of the baffle of FIG. 3, taken along line 4-4 of FIG. 3, when the baffle is in a resting position.
Figure 5:
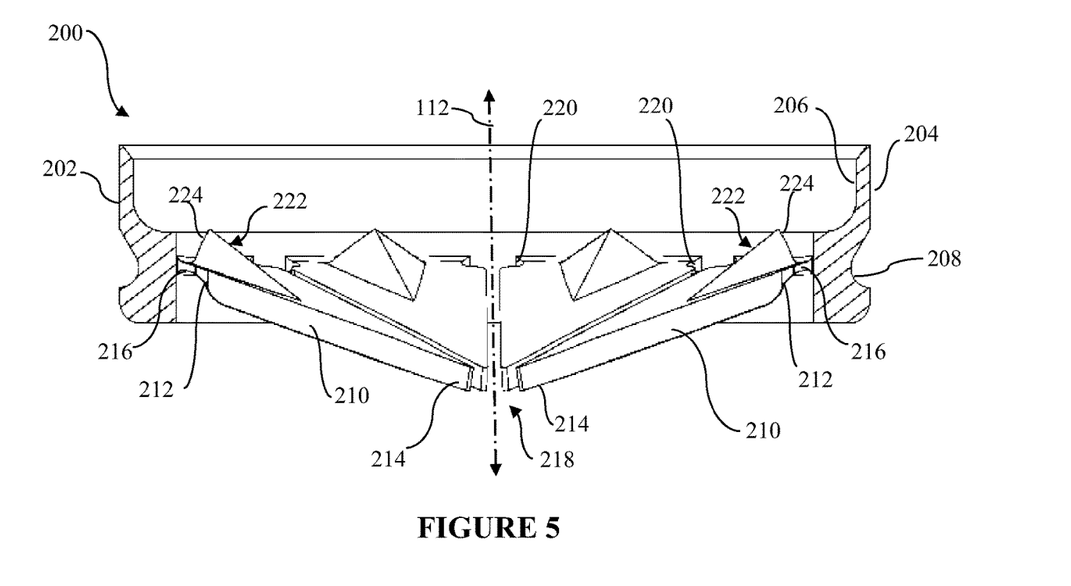
FIG. 5 is a side cut-away view of the baffle of FIG. 3, taken along line 5-5 of FIG. 3.

FIGS. 1-5 illustrate one example of a food waste disposer system of the present technology 100 having a baffle 200 of the present technology. FIGS. 1-2 provide views of the food waste disposer system 100 that includes the baffle 200 installed therein. FIGS. 3-5 provide views of the baffle 200 in isolation, not installed in the food waste disposer system 100.

FIG. 1 is a partly cross-sectional, partly front elevation view of one embodiment of food waste disposer system 100, shown as installed or mounted in relation to a sink 10. FIG. 1 particularly provides a cross-sectional view of the sink 10, so as to better illustrate how the food waste disposer system 100 is installed relative to the sink 10. FIG. 2 provides a front perspective view of the food waste disposer system 100 in isolation, not installed with respect to the sink.

Referring to FIGS. 1 and 2, the food waste disposer system 100 includes a disposer assembly 102 that includes a food waste disposer 104 and a mounting assembly (or sink flange assembly) 106 that is configured to attach the food waste disposer 104 to the sink 10. As used herein, the term "configured to" means that the component is structurally and functionally designed and formed in a manner that does whatever the component is said to be configured to do.

The mounting assembly 106 includes a baffle 200, a sink flange (or strainer flange) 108, and an upper mounting flange 110. It should be appreciated that FIG. 1 provides a cross-sectional view of both the sink 10 and the sink flange 108 of the food waste disposer system 100, with both cross-sections being taken along the same vertical plane. The sink flange 108 is configured to be, and can be, attached to the sink 10, and the upper mounting flange 110 can be configured to couple the food waste disposer 104 to the sink flange 108.

In FIG. 1, the food waste disposer system 100 is positioned vertically or substantially vertically beneath the sink 10, and a schematic central axis 112 is shown to extend vertically or substantially vertically from the sink 10 downwardly through the mounting assembly 106, including the sink flange 108 and baffle 200, into the grinding chamber within the food waste disposer 104 of the disposer assembly 102.

Referring to FIGS. 3-5, the baffle 200 includes an outer rim 202. The outer rim 202 may extend circumferentially about the central axis 112. The outer rim 202 may be generally disk-shaped or cylindrical, and may have a generally circular cross-section, or may have any other suitable shape. The outer rim 202 includes an outer surface 204 that is configured to interface a complementary inner surface of the sink flange 108 when the baffle 200 is implemented therein. The outer rim 202 also includes an inner surface 206.

The outer surface 204 may include an annular groove (or depression) 208, which may extend circumferentially around at least a portion of the outer rim 202 of the baffle 200, and as shown extends circumferentially around the entire circumference of the outer rim 202 of the baffle 200. The annular groove 208 is configured to receive therein a complementary annular protrusion or rib (not shown) that is formed along the inner surface of the sink flange 108 when the baffle 200 is fully positioned into the sink flange 108. By virtue of such interplay between the annular groove 208 and the complementary annular rib of the sink flange 108, the baffle 200 can be positioned at a desired location relative to, supported by, and retained within (and fixed or substantially fixed in position relative to) the sink flange 108 once the rib of the sink flange has been received by the annular groove 208. In particular, the interplay of the annular groove 208 and complementary annular rib enable the baffle 200 to be relatively easily positioned, by a person installing the baffle, at a desired axial location (e.g., at a desired vertical level) within and axially along the sink flange 108 along the central axis 112.

It should be understood, however, that in other embodiments encompassed herein the reversible baffle may have one or more other features in addition to or instead of the annular groove 208, and/or the sink flange 108 may have one or more other features in addition to or instead of the complementary annular rib, that allow for the baffle 200 to be fixed in place relative to, supported by, and retained within the sink flange 108.

Additionally, although the baffle 200 is illustrated in FIGS. 3-5 as having a disk-shaped or cylindrical outer rim 202, in other embodiments encompassed herein the baffle 200 may take another form that is not cylindrical but rather is another shape. For example, in some other embodiments the baffle 200 can be oval in shape, square or substantially square in shape (e.g., generally square but with rounded corners), or any other suitable shape. To the extent that the baffle 200 has a shape that is not disk-shaped or cylindrical, other components of the food waste disposer system 100, such as the sink flange 108, may also be correspondingly modified, to be complementary to the shape of the baffle 200.

The baffle 200 also includes a plurality of flaps 210. Each flap 210 has a hinge end 212 and a radially inward end 214. Each flap 210 is attached to the inner surface 206 of the outer rim 202 by a hinge 216. The hinges 216 and flaps 210 may be integrally formed with respect to each other, and may also be integrally formed with respect to the outer rim 202.

Each flap 210 extends radially inwardly from the hinge 216 toward the central axis 112. In the illustrated example, the flaps 210 extend radially inwardly toward the central axis 112, but not all the way up to the central axis 112. Each flap 210 thus extends radially inwardly from the hinge 216 up to the radially inward end 214, and the radially inward ends 214 of the plurality of flaps 210 define a central orifice 218 that is circumferentially positioned about the central axis 112.

As shown in FIGS. 4 and 5, in the illustrated example, the thickness of each hinge 216 is less than the thickness of each flap 210. The thickness, as well as the width, of the hinges can vary depending upon factors such as resistance to tearing and force needed to bend the flap 210 downwardly to allow food to pass through the baffle into the food waste disposer 104.

Each flap 210 may be generally shaped like a wedge when viewed from the top. In other words, the hinge end 212 of each flap may be wider than the radially inward end 214 of the flap. The radially inward end 212 of each flap 210 may have any suitable shape, and may come to a point, or may be truncated. Each flap 210 may include at least one flap opening 220, and each flap opening 220 may be configured to allow air and water to pass through the baffle. In the example shown in FIGS. 3-5, the hinge end 212 of each flap 210 includes two flap openings 220, one on each side of the hinge end 212 of the flap 210. Each flap opening 220 may have any suitable shape, such as semi-circular, semi-oval, or otherwise contoured, curved or notched. A first flap opening 220 on a first flap 210 may be configured to align with a second flap opening 220 on a second flap 210 to form in cooperation a larger opening, which may be generally circular, ovoid, or have any other suitable shape.

The baffle 200 also includes an anti-reverse stopper 222 attached to the hinge end 212 of each flap 210. Each anti-reverse stopper 222 extends upwardly from the hinge end 212 of the flap 210 to which the anti-reverse stopper 222 is attached. Additionally, each anti-reverse stopper 222 has a radially-outward end 224 that is spaced apart from the inner surface 206 of the outer rim 202 when the flap 210 to which the anti-reverse stopper 222 is attached is in a resting position, as best shown in FIG. 4. During operation, food waste may push each of, or any of, the flaps 210 upwardly, into a raised position. Each anti-reverse stopper 222 is configured to, and thus may, abut the inner surface 206 of the outer rim 202 when the flap 210 to which the anti-reverse stopper 222 is attached is in a raised position, and thus provides resistance to upward movement of the flap to which the anti-reverse stopper is attached beyond the raised position.

The amount of resistance to upward movement of the flap 210 that is provided by the anti-reverse stopper may be dependent upon several factors, including for example the height, shape and length of the anti-reverse stopper 222, as well as the distance 226 that the radially-outward end 224 is spaced apart from the inner surface 206 of the outer rim 202 when the flap 210 to which the anti-reverse stopper 222 is attached is in a resting position.

As shown in FIGS. 3-6, each anti-reverse stopper 222 can extend radially inwardly along at least a portion of a length of the flap 210 to which the anti-reverse stopper 222 is attached. In at least some examples, each anti-reverse stopper 222 can extend radially inwardly along from about 10% to about 90% of the length of the flap 210 to which the anti-reverse stopper 222 is attached. In some such examples, each anti-reverse stopper 222 can extend radially inwardly along from about 30% to about 50% of the length of the flap 210 to which the anti-reverse stopper 222 is attached. In at least one such example, each anti-reverse stopper 222 can extend radially inwardly along from about 35% to about 45% of the length of the flap 210 to which the anti-reverse stopper 222 is attached.

Each anti-reverse stopper 222 can have any suitable shape. In the illustrated example, as best shown in FIGS. 3-6, each anti-reverse stopper 222 can have a pyramidal shape. In alternative examples, anti-reverse stoppers 222 can have other shapes, such as wedges, rectangles, or any other suitable shape. Additionally, each anti-reverse stopper 222 can be tapered, such that the thickness of the anti-reverse stopper 222 is greatest at the radially-outward end 224 and the thickness of the anti-reverse stopper 222 is reduced as the anti-reverse stopper extends radially inwardly. In at least some examples, each anti-reverse stopper 222 may be have the same shape as each other anti-reverse stopper 222. In other examples, one or more of the anti-reverse stoppers 222 may be a different shape from one or more of the other anti-reverse stoppers 222.

The distance 226 that the radially-outward end 224 is spaced apart from the inner surface 206 of the outer rim 202 when the flap 210 to which the anti-reverse stopper 222 is attached is in a resting position may vary, depending upon the size and shape of the anti-reverse stoppers 222, and the degree of resistance necessary to prevent food waste from backing-up into the sink in the specific application. In at least some examples, the radially-outward end 224 of each anti-reverse stopper 222 may be spaced apart from the outer rim when the flap 210 to which the anti-reverse stopper 222 is attached is in a resting position by a distance that is greater than about 0.01 inches, or less than 0.10 inches, such as, for example, a distance of from about 0.025 inches to about 0.075 inches.

The baffle 200 in its entirety, or any of the components thereof, including the outer rim, hinges, flaps, and anti-reverse stoppers, may be made from nitrile rubber, or from one or more other materials instead of or in addition to nitrile rubber. Such other materials can include other elastomers, such as thermoplastic elastomers (TPE) or silicone rubber. Each of the components of the baffle 200, including the outer rim, hinges, flaps, and anti-reverse stoppers, may be made of the same material or different materials. In some examples, each hinge, each flap and each anti-reverse stopper are integrally formed with the outer rim.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A baffle for a food waste disposer, the baffle comprising:
   an outer rim that extends circumferentially about a central axis;
   a plurality of flaps, each flap having a hinge end and a radially inward end, the hinge end being attached to the outer rim by a hinge, wherein each flap extends radially inwardly from the hinge toward the central axis to the radially inward end; and
   an anti-reverse stopper attached to the hinge end of each flap, wherein (i) each anti-reverse stopper extends upwardly from the hinge end of each flap to which each anti-reverse stopper is attached, (ii) an inner surface of the outer rim extends upwardly from a radially-outward end of the hinge, and (iii) each anti-reverse stopper has a radially-outward end that extends upwardly from a radially-inward end of the hinge such that the radially-outward end of each anti-reverse stopper is spaced apart from and faces toward the inner surface of the outer rim when each flap to which each anti-reverse stopper is attached is in a resting position.

2. The baffle of claim 1, wherein each anti-reverse stopper abuts the inner surface of the outer rim when each flap to which each anti-reverse stopper is attached is in a raised position and provides resistance to upward movement of each flap to which each anti-reverse stopper is attached beyond the raised position.

3. The baffle of claim 1, wherein the hinge end of each flap is wider than the radially inward end of each flap.

4. The baffle of claim 1, wherein the hinge end of each flap includes at least one flap opening configured to allow air and water to pass through the baffle.

5. The baffle of claim 1, wherein each anti-reverse stopper extends radially inwardly along at least a portion of a length of each flap to which each anti-reverse stopper is attached.

6. The baffle of claim 5, wherein each anti-reverse stopper is tapered such that a thickness of each anti-reverse stopper is greatest at the radially-outward end and the thickness of each anti-reverse stopper is reduced as each anti-reverse stopper extends radially inwardly.

7. The baffle of claim 5, wherein each anti-reverse stopper has a pyramidal shape.

8. The baffle of claim 1, wherein the radially-outward end of each anti-reverse stopper is spaced apart from the inner surface of the outer rim by a first distance, the inner surface of the outer rim extends upwardly from the radially-outward end of the hinge by a second distance, and the radially-outward end of each anti-reverse stopper extends upwardly from the radially-inward end of the hinge by a third distance when each flap to which each anti-reverse stopper is attached is in the resting position, and wherein the second and third distances are greater than the first distance.

9. The baffle of claim 8, wherein the inner surface of the outer rim and the radially-outward end of each anti-reverse stopper are parallel to each other when each flap to which each anti-reverse stopper is attached is in the resting position.

10. The baffle of claim 1, wherein the inner surface of the outer rim includes a first region and a second region, the first region is disposed below and separated from the second region by a step such that an inner diameter of the first region is smaller than an inner diameter of the second region, and wherein the inner surface of the outer rim extends upwardly from the radially-outward end of the hinge along the first region.

11. A food waste disposer system comprising:
a food waste disposer; and
a mounting assembly configured to attach the food waste disposer to a sink, the mounting assembly including a baffle, a sink flange, and an upper mounting flange;
wherein the sink flange is configured to be attached to the sink, and the upper mounting flange is configured to couple the food waste disposer to the sink flange; and
wherein the baffle includes:
an outer rim that extends circumferentially about a central axis;
a plurality of flaps, each flap having a hinge end and a radially inward end, the hinge end being attached to the outer rim by a hinge, wherein each flap extends radially inwardly from the hinge toward the central axis to the radially inward end; and
an anti-reverse stopper attached to the hinge end of each flap, wherein (i) each anti-reverse stopper extends upwardly from the hinge end of each flap to which each anti-reverse stopper is attached, (ii) an inner surface of the outer rim extends upwardly from a radially-outward end of the hinge, and (iii) each anti-reverse stopper has a radially-outward end that extends upwardly from a radially-inward end of the lunge such that the radially-outward end of each anti-reverse stopper is spaced apart from and faces toward the inner surface of the outer rim when each flap to which each anti-reverse stopper is attached is in a resting position.

12. The food waste disposer system of claim 11, wherein each anti-reverse stopper abuts the inner surface of the outer rim when each flap to which each anti-reverse stopper is attached is in a raised position and provides resistance to upward movement of each flap to which each anti-reverse stopper is attached beyond the raised position.

13. The food waste disposer system of claim 11, wherein the hinge end of each flap is wider than the radially inward end of each flap.

14. The food waste disposer system of claim 11, wherein the hinge end of each flap includes at least one flap opening configured to allow air and water to pass through the baffle.

15. The food waste disposer system of claim 11, wherein each anti-reverse stopper extends radially inwardly along at least a portion of a length of each flap to which each anti-reverse stopper is attached.

16. The food waste disposer system of claim 15, wherein each anti-reverse stopper is tapered such that a thickness of each anti-reverse stopper is greatest at the radially-outward end and the thickness of each anti-reverse stopper is reduced as each anti-reverse stopper extends radially inwardly.

17. The food waste disposer system of claim 15, wherein each anti-reverse stopper extends radially inwardly along a distance that is between 25% and 50% of the length of each flap to which each anti-reverse stopper is attached.

18. The food waste disposer system of claim 11, wherein the radially-outward end of each anti-reverse stopper is spaced apart from the inner surface of the outer rim by a first distance, the inner surface of the outer rim extends upwardly from the radially-outward end of the hinge by a second distance, and the radially-outward end of each anti-reverse stopper extends upwardly from the radially-inward end of the hinge by a third distance when each flap to which each anti-reverse stopper is attached is in the resting position, and wherein the second and third distances are greater than the first distance.

19. The food waste disposer system of claim 18, wherein the inner surface of the outer rim and the radially-outward end of each anti-reverse stopper are parallel to each other when each flap to which each anti-reverse stopper is attached is in the resting position.

20. The food waste disposer system of claim 11, wherein the inner surface of the outer rim includes a first region and a second region, the first region is disposed below and separated from the second region by a step such that an inner diameter of the first region is smaller than an inner diameter of the second region, and wherein the inner surface of the outer rim extends upwardly from the radially-outward end of the hinge along the first region.

* * * * *